(12) United States Patent
Kim et al.

(10) Patent No.: US 10,793,223 B2
(45) Date of Patent: Oct. 6, 2020

(54) BICYCLE TRANSMISSION HUB

(71) Applicants: Bok Soung Kim, Seoul (KR); Do Hwan Kim, Seoul (KR); BYGEN CO., LTD., Namyangju-si (KR)

(72) Inventors: Bok Soung Kim, Seoul (KR); Do Hwan Kim, Seoul (KR)

(73) Assignees: Bok Soung Kim, Seoul (KR); Do Hwan Kim, Seoul (KR); BYGEN CO., LTD., Namyangju-si (KR)

( * ) Notice: Subject to any disclaimer, the term of this patent is extended or adjusted under 35 U.S.C. 154(b) by 158 days.

(21) Appl. No.: 16/099,535

(22) PCT Filed: Apr. 25, 2017

(86) PCT No.: PCT/KR2017/004367
§ 371 (c)(1),
(2) Date: Nov. 7, 2018

(87) PCT Pub. No.: WO2017/196003
PCT Pub. Date: Nov. 16, 2017

(65) Prior Publication Data
US 2019/0144073 A1  May 16, 2019

(30) Foreign Application Priority Data

May 12, 2016 (KR) .......................... 10-2016-0058066

(51) Int. Cl.
*B62M 11/16* (2006.01)
*B62M 25/04* (2006.01)
(Continued)

(52) U.S. Cl.
CPC ............. *B62M 11/16* (2013.01); *B60B 27/02* (2013.01); *B60B 27/023* (2013.01); *B60B 27/04* (2013.01);
(Continued)

(58) Field of Classification Search
CPC .................................. F16H 3/66; B62M 11/16
See application file for complete search history.

(56) References Cited

U.S. PATENT DOCUMENTS 6,387,008 B1 * 5/2002 Chen ...................... B62M 11/16
192/43.2
6,468,178 B1 * 10/2002 Mohtasham ........... B62M 11/16
280/238
(Continued)

FOREIGN PATENT DOCUMENTS

KR     100498888      7/2005
KR     20080101927    11/2008
(Continued)

OTHER PUBLICATIONS

International Search Report—PCT/KR2017/004367 dated Jul. 27, 2017.

*Primary Examiner* — Terence Boes
(74) *Attorney, Agent, or Firm* — Cantor Colburn LLP (57) ABSTRACT

A bicycle transmission hub includes: a hub shaft to input a rotation force is input, the hub shaft having first pawls arranged on the outer peripheral surface thereof; a transmission controller for controlling the first pawls to appear and disappear; driving gears, each having a ratchet formed on the inner peripheral surface thereof to receive a rotation force by the first pawls, the driving gears having a different number of teeth, the hub shaft extending through the center of each driving gear; driven gears engaged with the driving gears, respectively, having a different number of teeth, and rotating; an output wheel rotating while being coupled to a driving gear adjacent thereto among the driving gears and having a second pawl disposed on the outer peripheral surface thereof; and a hub shell having a ratchet formed on the inner peripheral surface thereof to receive a rotation force by the second pawl.

4 Claims, 14 Drawing Sheets

(51) Int. Cl.
    *B60B 27/02*     (2006.01)
    *B60B 27/04*     (2006.01)
    *F16H 3/66*     (2006.01)
    *B62M 11/06*     (2006.01)
    *F16H 63/18*     (2006.01)

(52) U.S. Cl.
    CPC ............ *B62M 11/06* (2013.01); *B62M 25/04* (2013.01); *F16H 3/66* (2013.01); *F16H 63/18* (2013.01); *F16H 2200/2012* (2013.01); *F16H 2200/2089* (2013.01)

(56) References Cited

U.S. PATENT DOCUMENTS

| | | | | |
|---|---|---|---|---|
| 2002/0183159 A1* | 12/2002 | Okochi | ............... | B62M 11/16 475/269 |
| 2005/0252750 A1* | 11/2005 | Matsueda | ............ | B62M 11/16 192/217.4 |
| 2009/0170654 A1* | 7/2009 | Hino | ............. | B62M 11/16 475/297 |
| 2010/0311535 A1* | 12/2010 | Yun | ............. | F16H 3/66 475/275 |
| 2012/0305325 A1* | 12/2012 | Ito | ............. | B60L 15/2054 180/206.6 |
| 2020/0109769 A1* | 4/2020 | Kim | ............. | H02K 7/116 |

FOREIGN PATENT DOCUMENTS

| | | |
|---|---|---|
| KR | 20120006384 | 1/2012 |
| KR | 101260050 | 5/2013 |

\* cited by examiner

BICYCLE TRANSMISSION HUB

TECHNICAL FIELD

The present invention relates to a bicycle transmission hub and, more specifically, to a bicycle transmission hub, which can directly rotate the hub shaft and shift input rotation force thereof without any ring gear.

BACKGROUND ART

The transmission of a bicycle is divided into an external gear and an internal gear, wherein the internal gear includes a fixed hub shaft and a planetary gear system having a sun gear, a carrier axially coupled with planetary gears, and a ring gear.

Conventional planetary gear systems have problems that since a driven sprocket rotates through a chain with the rotation force generated by rotating a crank and the driven sprocket rotates in conjunction with a carrier, it is not possible to make a bicycle capable of transmission while directly driving a hub shaft without such a chain.

Furthermore, the conventional planetary gear system has a complicated structure because a ring gear as well as a sun gear and planetary gears must be provided.

DISCLOSURE

Technical Problem

Accordingly, the present invention has been made in an effort to solve the above-mentioned problems and disadvantages occurring in the prior arts and has an objective to provide a bicycle transmission hub capable of directly rotating a hub shaft and shifting the input rotation force thereof.

The present invention has another object to provide a bicycle transmission hub capable of shifting rotation force and transmitting the same to a hub shell without any ring gear.

Technical Solution

In order to solve the technical problems as explained above, a bicycle transmission hub according to the present invention comprises: a hub shaft to which a rotation force is input, the hub shaft having a plurality of first pawls arranged on the outer peripheral surface thereof; a transmission controller for controlling the appearing and disappearing of the first pawls; a plurality of driving gears, each of which has a ratchet formed on the inner peripheral surface thereof to receive a rotation force transferred by the first pawls, the driving gears having a different number of teeth, the hub shaft extending through the center of each of the driving gears; a plurality of driven gears, which are engaged with the driving gears, respectively, have a different number of teeth, and rotate while being coupled to each other; an output wheel, which rotates while being coupled to a driving gear adjacent thereto among the driving gears and has a second pawl disposed on the outer peripheral surface thereof; and a hub shell, which has a wheel spoke connected thereto and has a ratchet formed on the inner peripheral surface thereof to receive a rotation force transferred by the second pawl.

In addition, it is preferable that the transmission controller includes: a wire for transmission; an outer ring for rotating by the wire and having a guide hole formed diagonally with respect to the circumferential direction in the outer peripheral surface; an inner ring provided inside the outer ring and having a guide pin, which is protruded and confined in the guide hole, so as to move forward and backward by the rotation of the outer ring; and a lever for enabling the first pawls to appear and disappear by the forward and backward movement of the inner ring.

In addition, it is preferable that the lever includes: an input part pressed and lowered by the forward and backward movement of the inner ring; a rotating rod coupled with the input part so as to rotate by the lowering of the input part; and an output part protruded by the rotation of the rotating rod so as to raise the first pawls.

In addition, it is preferable that the hub shaft has a seating groove formed on the outer peripheral surface of the hub shaft such that the lever is seated thereon.

Advantageous Effects

As described above, according to the present invention, it is possible to directly rotate the hub shaft and shift the input rotation force.

In addition, the input rotation force can be transferred to the hub shell without any ring gear.

BEST MODE FOR CARRYING OUT THE DISCLOSURE

Hereinafter, a bicycle transmission hub according to an embodiment of the present invention will be described in detail in terms of configuration and operation with reference to the accompanying drawings.

Figure 1:
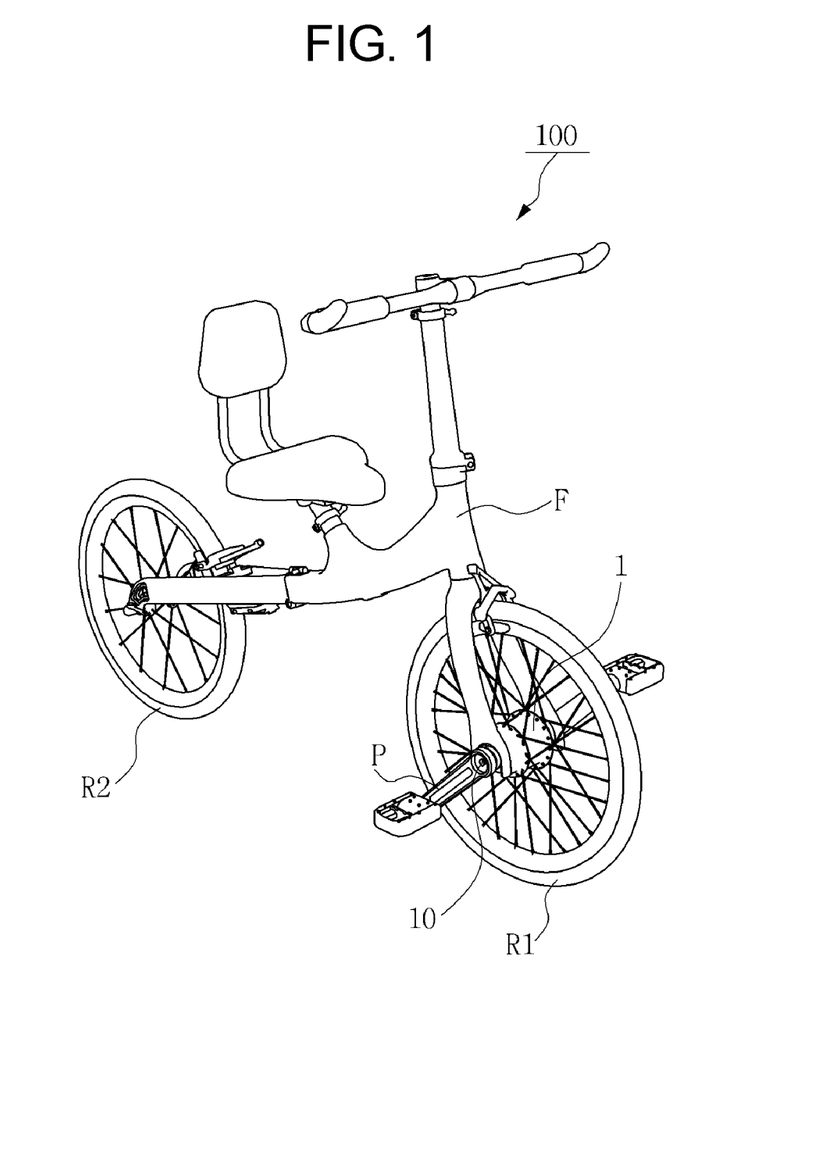
FIG. 1 shows a bicycle equipped with an embodiment according to the present invention.
Figure 2:
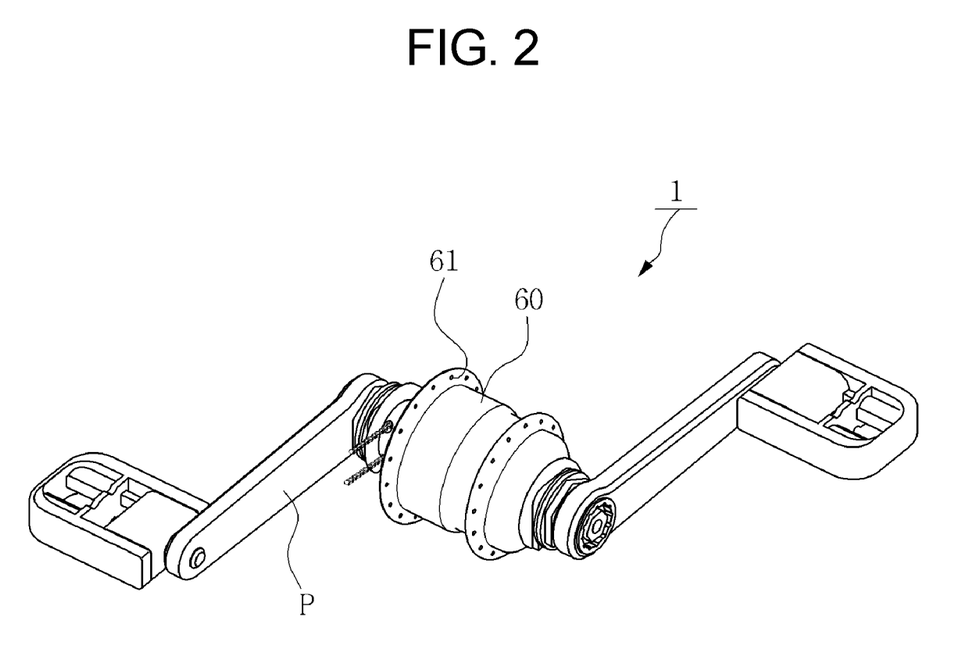
FIG. 2 to FIG. 4 show an embodiment of the present invention.

FIG. 1 shows embodiment 1 of the present invention, which is coupled to a front wheel drive bicycle 100, and FIG. 2 shows embodiment 1 of the present invention, to which a crank is coupled. As can be seen, embodiment 1 according to the present invention is provided to the central axis of a front wheel. In addition, as can be seen, a crank P is directly connected to a hub shaft 10 in embodiment 1. Therefore, the hub shaft 10 is directly rotated by pedaling the crank P without any chain or sprocket. In addition, the rotation force of the hub shaft 10 is shifted to rotate the hub shell 60. A wheel spoke is coupled to the mounting hole 61 of the hub shell 60, and a front wheel R1 is rotated by the rotation of the hub shell 60. Reference symbol "F", which is not explained, denotes a frame and reference symbol "R2", which is not explained, denotes a rear wheel.

Figure 3:
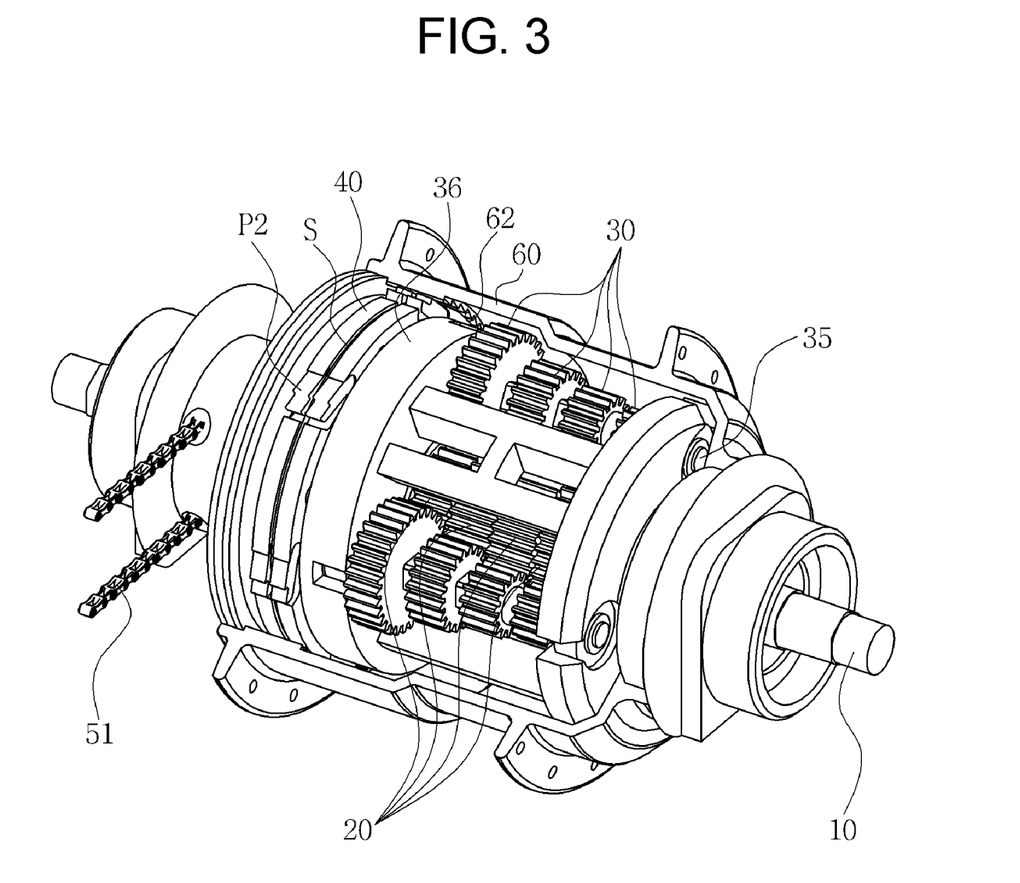
Figure 4:
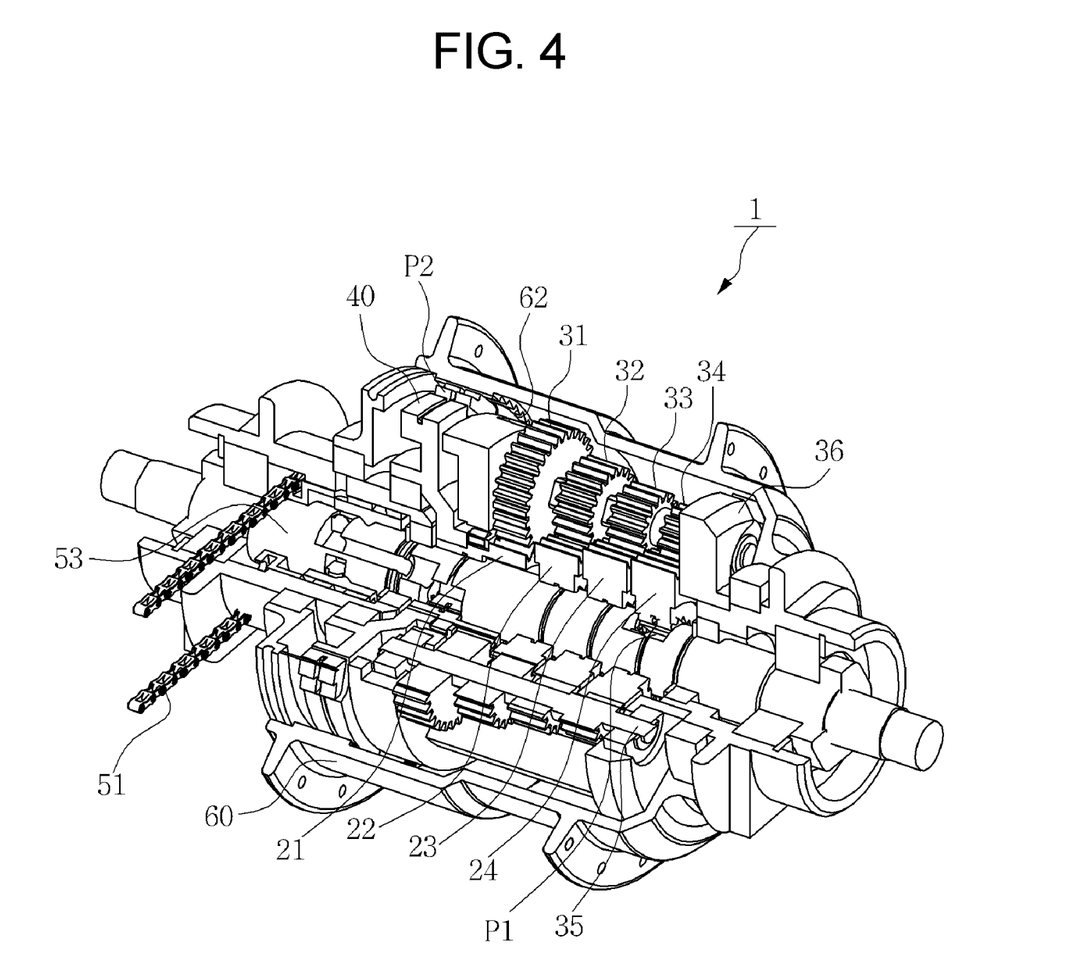

Referring to FIG. 3 and FIG. 4, embodiment 1 according to the present invention includes a hub shaft 10, a transmission controller (see "50" in FIG. 7) driving gears 20, driven gears 30, an output wheel 40 and a hub shell 60.

The hub shaft 10 is a constituent element, which is directly coupled to the crank P and receives a rotation force as described above, and a plurality of first pawls P1 are provided on the outer peripheral surface thereof.

The hub shaft 10 has four driving gears provided on the outer diameter portion thereof, such as a first driving gear 21, a second driving gear 22, a third driving gear 23 and a fourth driving gear 24, which have different numbers of teeth.

Figure 5:
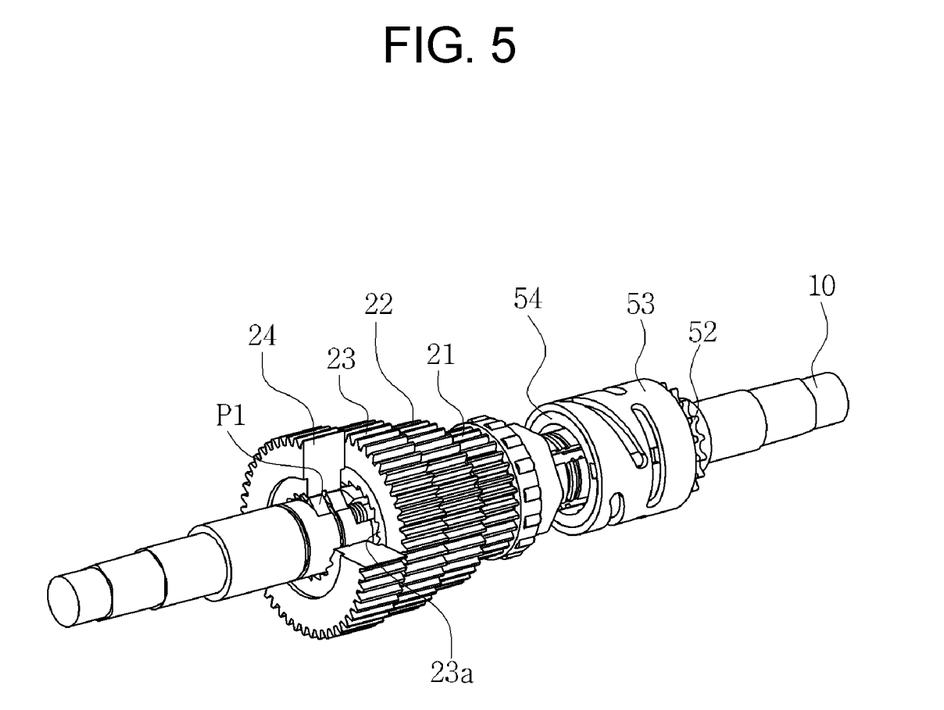
FIG. 5 to FIG. 11 show the main parts of an embodiment of the present invention.

That is, the hub shaft 10 penetrates the driving gears 21-24. A ratchet (see "23a" in FIG. 5) is formed on the inner peripheral surface of each of the driving gears 21 to 24 so as to be selectively engaged with the first pawls P1.

In addition, four driven gears such as a first driven gear 31, a second driven gear 32, a third driven gear 33, and a fourth driven gear 34 are provided to be engaged with the outer diameter portions of the driving gears 21-24. The driven gears 31-34 have different numbers of teeth. As a result, in this embodiment, four sets of driving gears 21-24 and driven gears 31-34 are engaged with each other.

Furthermore, the plurality of driven gears 31-34 neighbor and are arranged in parallel to each other but are coupled to each other such that all the plurality of driven gears 31-34 rotate together even if any one of the plurality of driven gears 31-34 rotates. The driven gears 31-34 are mounted to be fixed to a cylindrical gear box (see "36" in FIG. 6).

Figure 6:
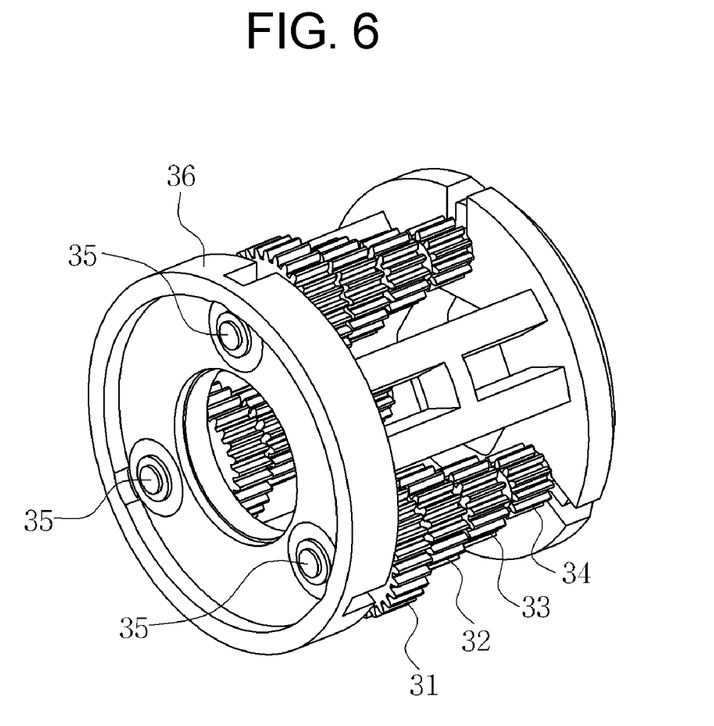

Specifically speaking, as shown in FIG. 6, three shafts 35 are provided in the gear box 36, and the four driven gears 31-34 are axially coupled to the respective shafts 35. Meanwhile, the driven gears 31-34 rotate while being engaged with the driving gears 21-24, wherein the gear box 36 does not rotate but only the driven gears 31-34 rotate while being coupled to the shafts 35.

In addition, an output wheel 40 for outputting a shifted rotation force is provided at one side of the driving gears 21-24 and the driven gears 31-34. In particular, the output wheel is engaged with the first driving gear 21, which is the closest to the output wheel 40. Accordingly, when the first driving gear 21 rotates, the output wheel 40 rotates in conjunction therewith. A second pawl P2 is provided on the outer peripheral surface of the output wheel 40.

Finally, a ratchet 62 is provided on the inner peripheral surface of the hub shell 60 and selectively engaged with the second pawl P2. As a means for transmitting the rotation force of the output wheel 40 to the hub shell 60, it is of course possible to apply a well-known means such as a clutch bearing instead of the second pawl P2 and the ratchet 62.

it can be seen that the hub shaft 10 penetrates the four driving gears 21-24. In addition, the hub shaft 10 is provided with four first pawls P1 and each of the four first pawls P1 is selectively engaged with each one of the four driving gears 21-24, thereby selectively transmitting the rotation force of the hub shaft 10 to driving gears 21-24. That is, when any one of the first pawls P1 protrudes from the hub shaft 10, one of the driving gears 21-24 is caught by the protruded first pawl P1 and thus rotates. Therefore, the driving gears 21-24 are formed with ratchets (see 23a) on the inner diameter portions so as to be caught by the first pawls P1.

Figure 7:
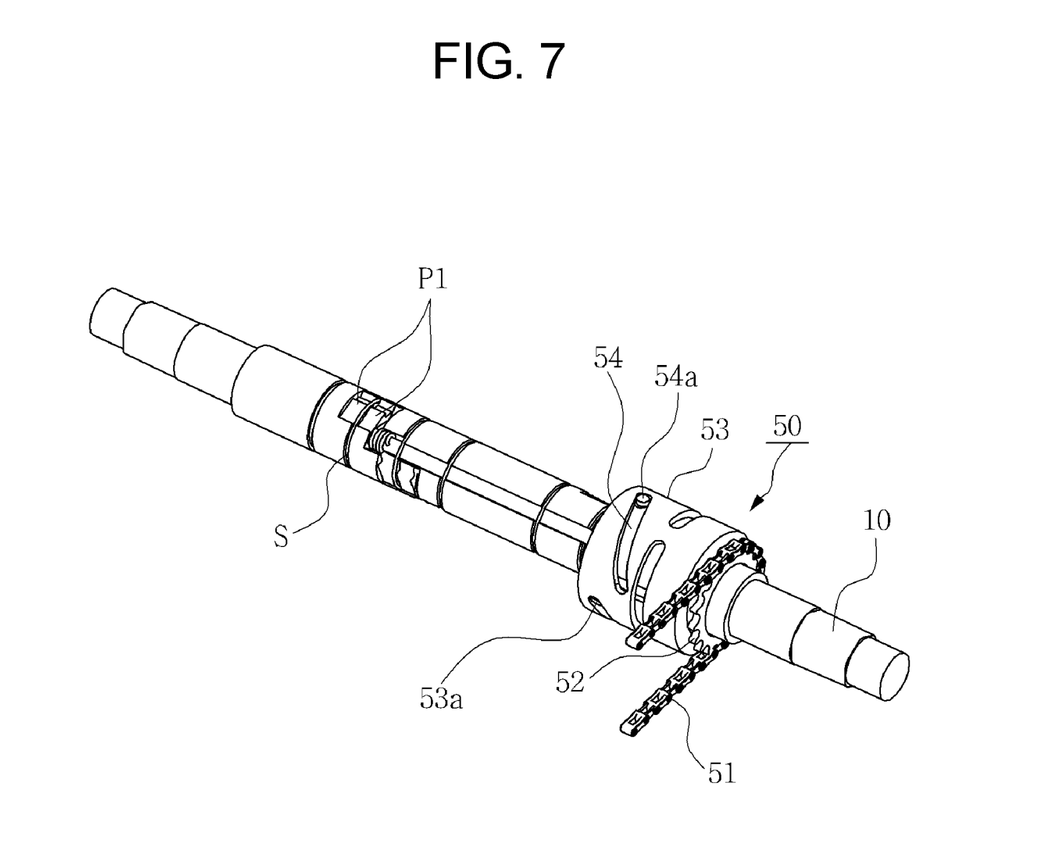

Referring to FIG. 7, the transmission controller 50 includes an outer ring 53 and an inner ring 54. The outer ring has a guide hole 53a formed obliquely with respect to the circumferential direction on the outer peripheral surface thereof and a sprocket 52 formed on one side of the outer ring 53. In addition, a transmission chain 51 is connected to the sprocket 52 as a wire, and the outer ring 53 is rotated in both directions by the transmission chain 51.

According to the present invention, it is of course possible to use a common wire instead of the transmission chain.

Furthermore, the inner ring 54 is provided inside the outer ring 53, wherein a guide pin 54a is formed on the outer peripheral surface of the inner ring 54 and is confined to the guide hole 53a. Accordingly, when the transmission chain 51 is pulled and thus the outer ring 53 is rotated in position in one direction, the guide pin 54a confined in the guide hole 53a moves along an oblique line, resulting in the forward or backward movement of the inner ring 54.

Figure 8:
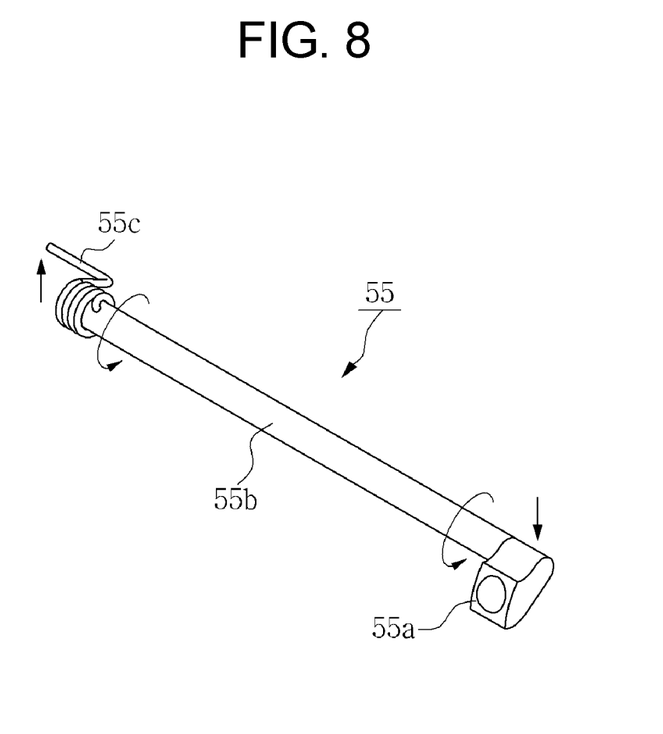

Furthermore, a seating groove is formed on the outer peripheral surface of the hub shaft 10 and thus the lever 55 is seated on the seating groove, wherein the lever 55 includes an input part 55a which is pressed and lowered by the forward or backward movement of the inner ring 54, a rotating rod 55b which is coupled to the input part 55a and rotates by the lowering of the input part 55a, and an output part 55c which protrudes from the seat groove of the hub shaft 10 by the rotation of the rotating rod 55b so as to enable the first pawls P1 to swing and lift, as shown in FIG. 8. That is, the output part 55c is provided on the seating groove of the hub shaft 10 and positioned at the lower portion of the first pawls P1. A metal ball such as a ball bearing is rotatably mounted on the input part 55a and a hemispherical mounting groove is formed on the upper surface of the input part 55a, so that the metal ball is rotatably seated.

Figure 9:
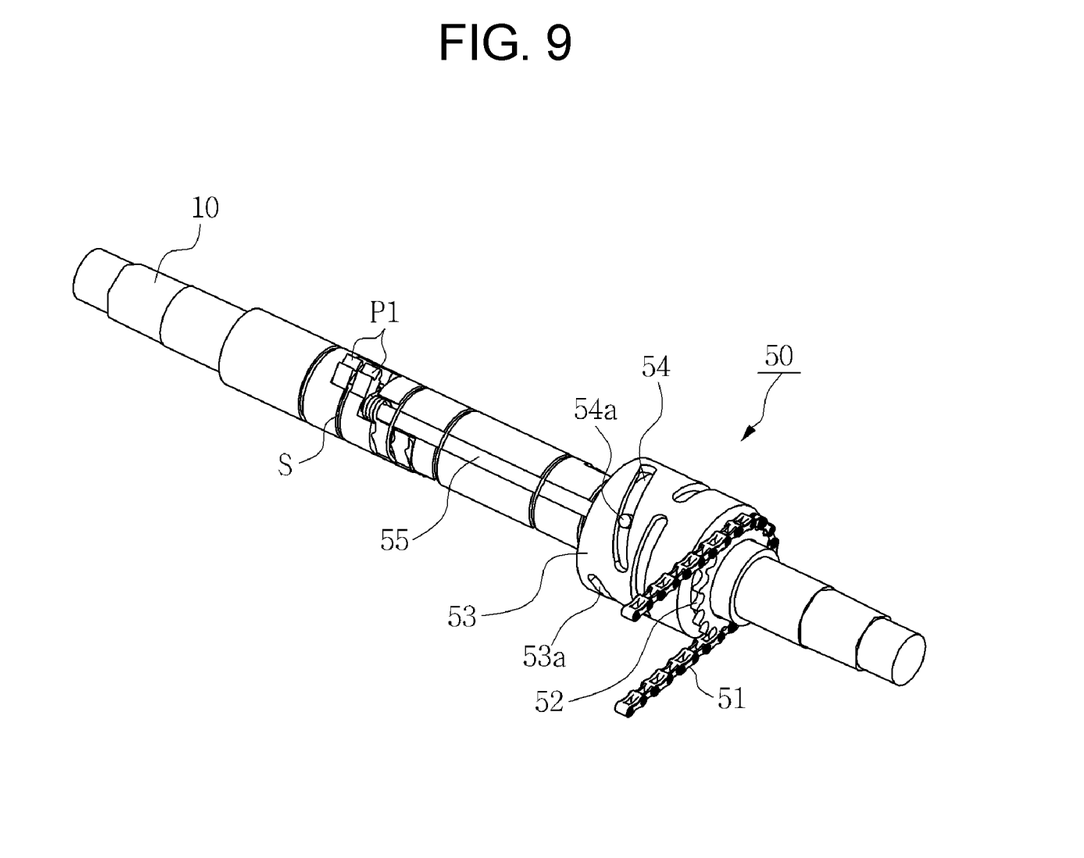

Referring to FIG. 9, when the transmission chain 51 is pulled out from the transmission controller 50, the sprocket 52 is rotated and the outer ring 53 coupled to the sprocket 52 is rotated in place. This operation causes the guide pin 54a confined to the guide hole 53a to move such that the inner ring is allowed to move forward or backward. Particularly, when the inner ring 54 moves forward or backward, the input part 55a is pressed down by the inner ring 54 and the rotating rod 55b is rotated in association with the input part 55a such that the output part 55c is lifted. As a result, the first pawl P1 is protruded from the hub shaft 10 and thus one of the driving gears 21-24 corresponding to the protruded first pawl P1 receives the rotation force of the hub shaft 10.

Meanwhile, in this embodiment, four levers 55 are mounted on the hub shaft 10, wherein as the inner ring 54 advances further according to the degree of pulling the transmission chain 51, four input parts 55a are sequentially pressed and lowered and accordingly output parts 55c formed at the opposite side of the input parts 55a are lifted so that any one of the first pawls P1 is protruded, thereby transmitting the rotation force to one of the driving gears 21-24, which is engaged with the protruded first pawl P1. The driving gears 21-24 respectively have different numbers of teeth from each other and the driven gears 31-34 to be engaged with the driving gears 21-24 respectively have different numbers of teeth from each other, such that transmission can be carried out.

Figure 10:
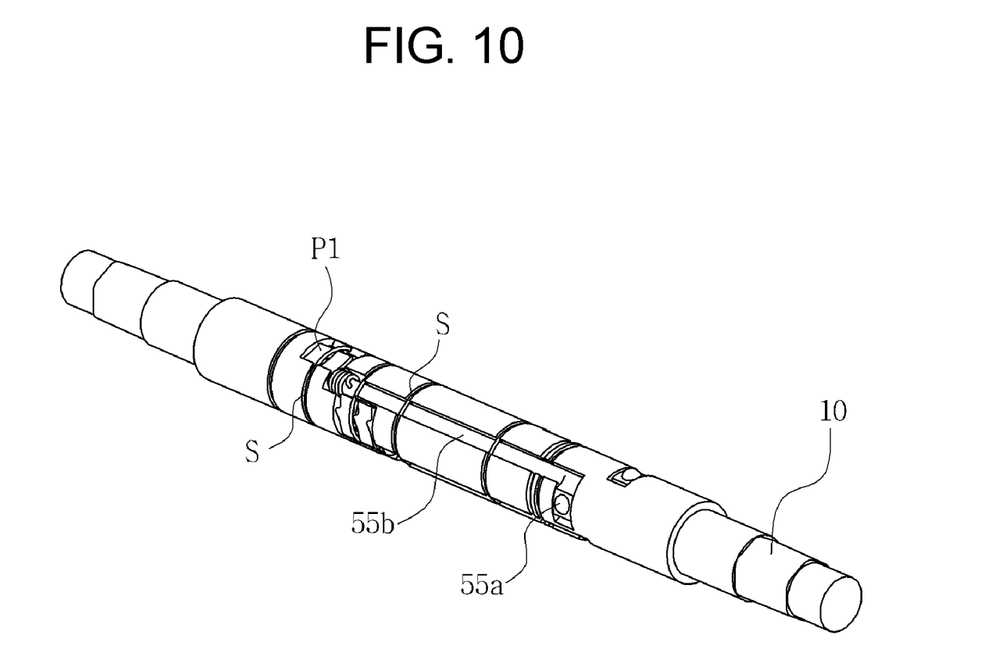
Figure 11:
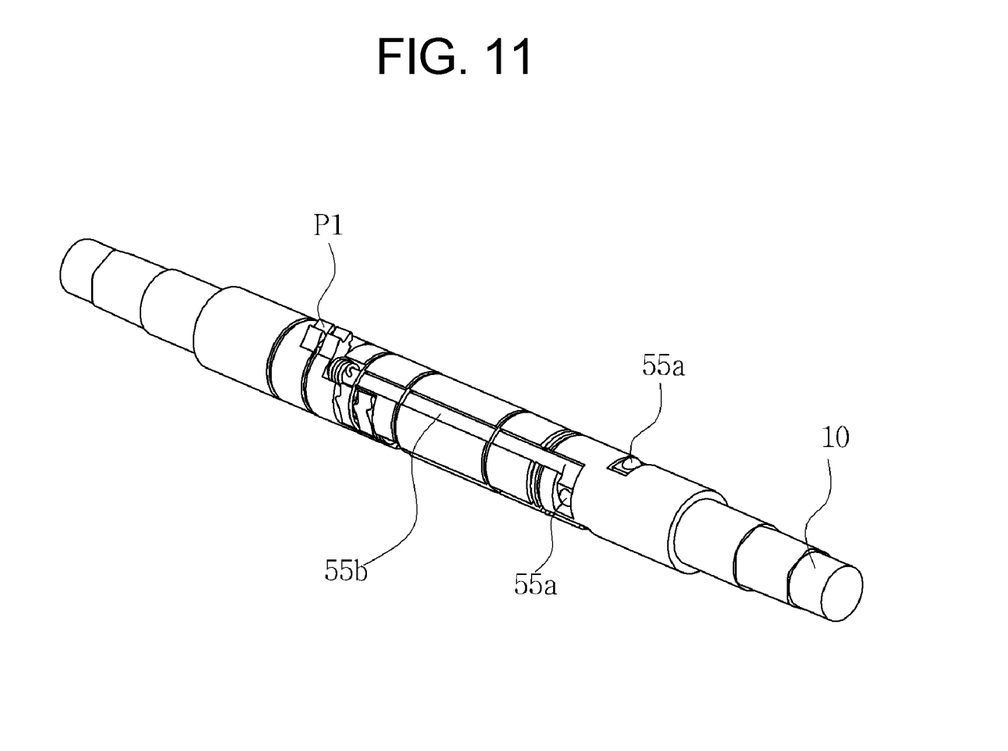

FIG. 10 and FIG. 11 show states, in which the lever 55 is seated on the seating groove of the hub shaft 10. FIG. 10 shows a state in which the input part 55a protrudes beyond the outer diameter portion of the hub shaft 10. In this state, the output part 55c is positioned on the bottom surface of the seating groove so that the first pawl P1 does not protrude from the outer diameter portion of the hub shaft 10.

To the contrary, FIG. 11 shows a state, in which the input part 55a is lowered to the bottom surface of the seating groove. In this state, the output part 55c is lifted and thus the first pawl P1 is lifted so that the first pawl P1 protrudes beyond the outer diameter portion of the hub shaft 10.

In addition, when the inner ring 54 further advances or retracts in the state shown in FIG. 11, the pressing of the inner ring 54 to the input part 55a is released and this causes the first pawl P1 to be lowered by a wire spring (see "S" in FIG. 9), which surrounds the first pawl P1, and the input part 55a to be lifted again with the rotation of the rotating rod 55b. Then, the engagement between the first pawls P1 and the driving gears 21-24 is also released.

Hereinafter, transmission process according to an embodiment of the present invention will be described.

Referring to FIG. 3 and FIG. 4, the pedaling of the crank causes the hub shaft 10, which is directly connected to the crank, to rotate, while the transmission controller 50 carries out control such that the first pawl P1 engaged the first driving gear 21 is lifted, thereby rotating the first driving gear 21. The first driving gear 21 enables the output wheel 40, which is coupled to the first driving gear 21, to rotate at the rotation speed of the hub shaft 10, and the second pawl P2 provided on the outer peripheral surface of the output wheel 40 is engaged with the ratchet 62, which is formed on the inner peripheral surface of the hub shell 60, and thus rotates the hub shell 60, thereby rotating the front wheel R1.

If a user manipulates the transmission chain 51 such that the inner ring 54 lifts the first pawl P1 corresponding to the third driving gear 23 of the plurality of first pawls P1, the third driving gear 23 is engaged with the first pawl P1 and thus rotates. Herein, when the third driving gear 23 rotates, the third driven gear 33 engaged with the third driving gear 23 rotates and accordingly all the driven gears 30 rotate at the same speed as the rotation speed of the third driven gear 33 in spite that only the third driven gear 33 is enabled to rotate by the rotation of the third driving gear 23, since all the first to fourth driven gears 31-34 are coupled together. Therefore, the first driven gear 31 is enabled to rotate at the rotation speed of the third driven gear 33 and finally the first driving gear 21 is enabled to rotate by the rotation of the first driven gear 31.

At this time, however, the rotation speed of the first driving gear 21 is not the rotation speed of the hub shaft 10 but the first driving gear 21 rotates at a speed shifted by the different numbers of teeth of the third driving gear 23 and the third driven gear 33. As described above, the first driving gear 21 rotates at the shifted speed, the output wheel 40 coupled to the first driving gear 21 rotates at the shifted speed, and the hub shell 60 rotates at the shifted speed by the second pawl P2 provided on the outer peripheral surface of the output wheel 40.

Meanwhile, when the third driving gear 23 is engaged with the first pawl P1 and thus rotates, since all the driven gears 31-34 are coupled together, not only the third driven gear 33 but all the driven gears 31-34 rotate, the driving gear 23 rotates, and the remaining driving gears 21, 22, 24 idle in addition to the rotation of the driving gear 23.

Likewise, by operating the transmission chain 51, if the first pawl P1 engaged with the fourth driving gear 24 is lifted and enables the fourth driving gear 24 to rotate with the rotation force of the hub shaft 10, then the fourth driving gear 24 rotates while being engaged with the fourth driven gear 34. This operation causes the first driven gear 31 to rotate at the rotation speed of the fourth driven gear 34, and thus the first driving gear 21 engaged with the first driven gear 31 rotates at this shifted speed. In response to the rotation of the first driven gear 31, the output wheel 40 and hub shell 60 also rotate at the shifted speed, thereby rotating a rear wheel R2 at the shifted speed.

MODE FOR CARRYING OUT THE INVENTION

Figure 12:
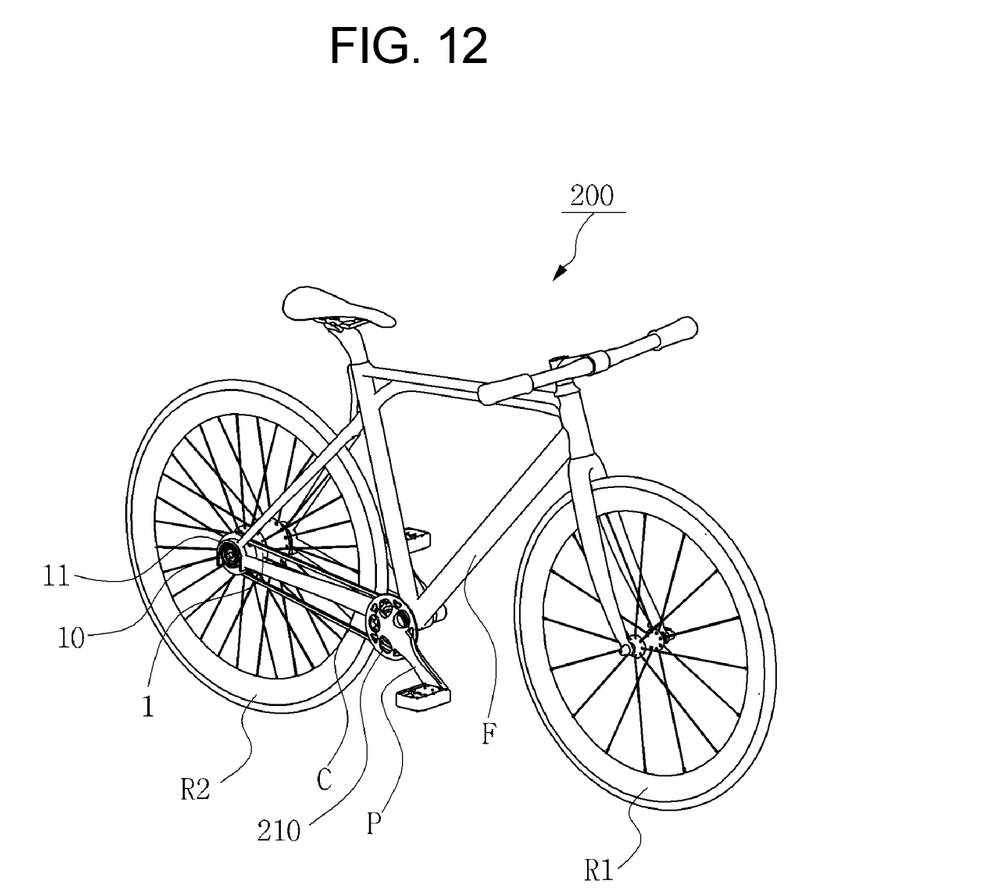
FIG. 12 shows another bicycle equipped with an embodiment of the present invention.

FIG. 12 shows embodiment 1 of the present invention, which is applied to a general chain bicycle 200. As illustrated, embodiment 1 of the present invention is provided in the center of the rear wheel R2 of the general chain bicycle 200. Therefore, when a crank P is pressed and rotated, a driving sprocket 210 rotates such that the rotation force of the driving sprocket 210 is transmitted to a driven sprocket 11 through a chain C, thereby rotating the driven sprocket 11. Then, a hub shaft 10, which is the center shaft of the rear wheel R2 coupled with the driven sprocket 11, is directly driven to rotate. Reference symbol "R1", which is not explained, denote a front wheel and reference symbol "F", which is not explained, denotes a frame.

Figure 13:
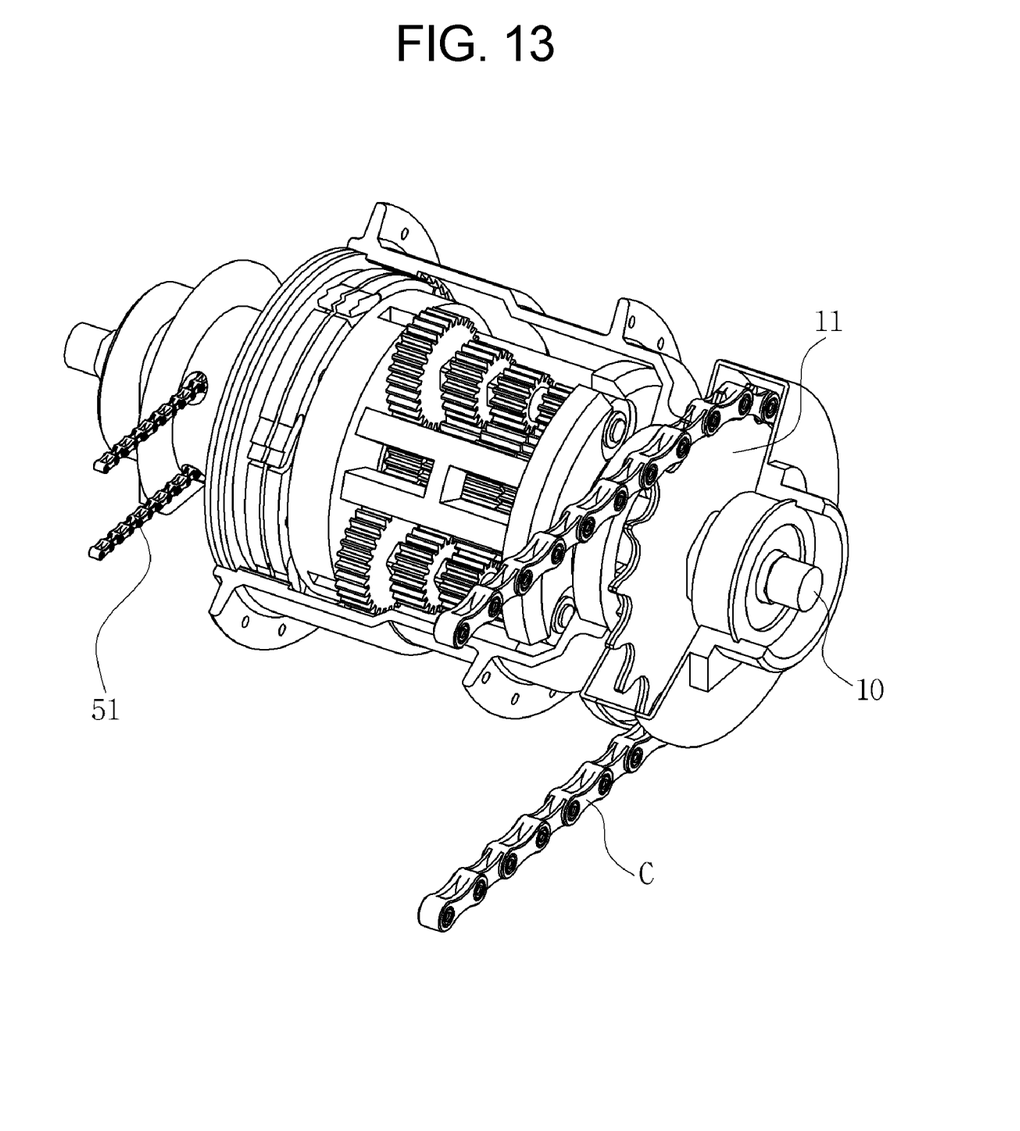
FIG. 13 and FIG. 14 show another embodiment of the present invention.
Figure 14:
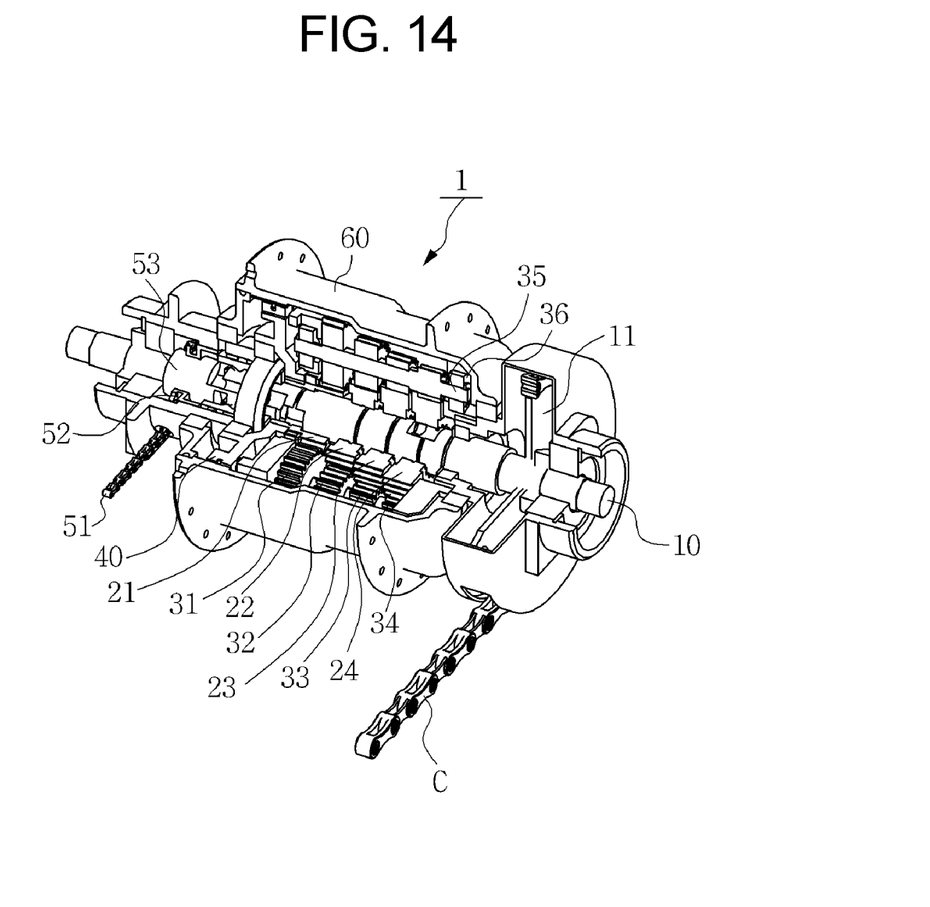

FIG. 13 and FIG. 12 show another embodiment adapted to be mounted on the bicycle shown in FIG. 12.

As can be seen, the driven sprocket 11, to which the rotation force is transmitted through the chain C, is integrally coupled to the hub shaft 10. Therefore, when the crank is rotated through pedaling, the driving sprocket 210 rotates, and the driven sprocket 11 rotates through the chain C, so that the hub shaft 10 finally rotates.

When the hub shaft 10 rotates as described above, speed can be changed as desired through the same operation as mentioned with respect to the previous embodiment.

INDUSTRIAL APPLICABILITY

In addition, the crank can be connected directly to the hub shaft so as to be driven without a chain, or the crank can be driven by transmitting the rotation force to the hub shaft through the chain.

The invention claimed is:

1. A bicycle transmission hub comprising:
   a hub shaft to which a rotation force is input, the hub shaft having a plurality of first pawls arranged on the outer peripheral surface thereof;
   a transmission controller for controlling the appearing and disappearing of the first pawls;
   a plurality of driving gears, each of which has a ratchet formed on the inner peripheral surface thereof to receive a rotation force transferred by the first pawls, the driving gears having a different number of teeth, the hub shaft extending through the center of each of the driving gears;
   a plurality of driven gears, which are engaged with the driving gears, respectively, have a different number of teeth, and rotate while being coupled to each other;
   an output wheel, which rotates while being coupled to a driving gear adjacent thereto among the driving gears and has a second pawl disposed on the outer peripheral surface thereof; and
   a hub shell, which has a wheel spoke connected thereto and has a ratchet formed on the inner peripheral surface thereof to receive a rotation force transferred by the second pawl.

2. The bicycle transmission hub according to claim 1, wherein the a transmission controller includes:
   a wire for transmission;
   an outer ring for rotating by the wire and having a guide hole formed diagonally with respect to the circumferential direction in the outer peripheral surface;
   an inner ring provided inside the outer ring and having a guide pin, which is protruded and confined in the guide hole, so as to move forward and backward by the rotation of the outer ring; and
   a lever for enabling the first pawls to appear and disappear by the forward and backward movement of the inner ring.

3. The bicycle transmission hub according to claim 2, wherein the lever includes:

an input part which is pressed and lowered by the forward and backward movement of the inner ring;
a rotating rod which is coupled to the input part so as to rotate by the lowering of the input part; and
an output part which is protruded by the rotation of the rotating rod so as to raise the first pawls.

4. The bicycle transmission hub according to claim 3, wherein the hub shaft has a seating groove formed on the outer peripheral surface of the hub shaft such that the lever is seated thereon.

* * * * *